US008609281B2

(12) United States Patent
Takahashi et al.

(10) Patent No.: US 8,609,281 B2
(45) Date of Patent: Dec. 17, 2013

(54) ELECTROLYTIC MANGANESE DIOXIDE, POSITIVE ELECTRODE ACTIVE MATERIAL, AND BATTERY

(75) Inventors: Kenichi Takahashi, Shunan (JP); Kazumasa Suetsugu, Shunan (JP); Setsuo Yoshida, Shunan (JP)

(73) Assignee: Tosoh Corporation, Yamaguchi (JP)

( * ) Notice: Subject to any disclaimer, the term of this patent is extended or adjusted under 35 U.S.C. 154(b) by 1453 days.

(21) Appl. No.: 11/759,085

(22) Filed: Jun. 6, 2007

(65) Prior Publication Data

US 2007/0287067 A1    Dec. 13, 2007

(30) Foreign Application Priority Data

Jun. 7, 2006   (JP) .................................. 2006-158283
Nov. 30, 2006  (JP) .................................. 2006-324908

(51) Int. Cl.
*H01M 4/13*  (2010.01)
*H01M 4/50*  (2010.01)
*H01M 6/04*  (2006.01)
*H01M 10/26* (2006.01)

(52) U.S. Cl.
USPC .......................................... 429/224; 429/206

(58) Field of Classification Search
USPC .................................................. 429/206, 224
See application file for complete search history.

(56) References Cited

U.S. PATENT DOCUMENTS

| | | | |
|---|---|---|---|
| 6,706,443 B1* | 3/2004 | Krampitz et al. | 429/224 |
| 2001/0024752 A1* | 9/2001 | Sumida et al. | 429/224 |
| 2004/0131934 A1* | 7/2004 | Sugnaux et al. | 429/209 |
| 2005/0153207 A1* | 7/2005 | Otsuki et al. | 429/232 |

* cited by examiner

*Primary Examiner* — Eugenia Wang
(74) *Attorney, Agent, or Firm* — Sughrue Mion, PLLC

(57) ABSTRACT

Electrolytic manganese dioxide characterized by having a surface sulfate ($SO_4$) content of smaller than 0.10% by weight and a JIS-pH value, as measured according to JIS K1467, of at least 1.5 but smaller than 3.5, preferably at least 2.1 but smaller than 3.2 is provided. Preferably 3% to 25% in number of the fine particles of the manganese dioxide have a particle diameter of not larger than 1 μm. A battery provided with a cathode made from the electrolytic manganese dioxide as active material exhibits good high-rate discharge characteristics and good resistance to metal corrosion.

1 Claim, 2 Drawing Sheets

ELECTROLYTIC MANGANESE DIOXIDE, POSITIVE ELECTRODE ACTIVE MATERIAL, AND BATTERY

TECHNICAL FIELD

This invention relates to electrolytic manganese dioxide for use as an active material for a cathode, for example, for a manganese dry battery, especially for an alkaline manganese dry battery. The electrolytic manganese dioxide according to the present invention gives a battery exhibiting improved high-rate discharge characteristics, and the electrolytic manganese dioxide causes no problem of metal corrosion when a cathode of battery is made from the electrolytic manganese dioxide.

BACKGROUND ART

Manganese dioxide is well known as an active material for a cathode, for example, for a manganese dry battery, especially for an alkaline manganese dry battery. Manganese oxide exhibits good durability and is inexpensive.

An alkaline manganese dry battery provided with a cathode comprising electrolyte manganese dioxide as an active material has excellent discharge characteristics at a heavy-load discharge. Therefore, the alkaline manganese dry battery is widely used for, for example, electronic cameras, portable tape recorders, personal digital assistants, game machines and toys, and the demand therefor is rapidly expanding in recent years. However, the alkaline manganese dry battery has a problem such that, with an increase of discharge electric current, the utilization of manganese dioxide as an active material for a cathode decreases, and the discharge voltage is reduced with the result of large reduction of discharge capacity. In other words, in the case when an alkaline manganese dry battery is equipped in an instrument utilizing a large electric current within a short period of time, i.e., a high-rate discharge is conducted, the utilization of manganese dioxide packed as a cathode active material is reduced and the durability of the instrument decreases. Therefore, manganese dioxide having improved high-rate characteristics, namely, capable of exhibiting a high capacity and an enhanced durability under intermittent high-rate discharge conditions in which a large electric current is taken in a short period of time is eagerly desired.

As manganese dioxide for use in a cathode active material for an intermittent high-rate discharge, manganese dioxide having enhanced high-rate characteristics was proposed in Japanese Unexamined Patent Publication No. 2002-304990, which has a surface sulfate content of at least 0.10% by weight, and a controlled alkali metal content of smaller than 0.20% by weight. Further, electrolytic manganese dioxide having a sulfate group content in the range of 1.3% to 1.6% by weight was proposed in Japanese Unexamined Patent Publication No. 2004-047445 (U.S. Pat. No. 3,712,259). Although the high-rate characteristics of the manganese dioxide proposed in these patent publications are enhanced to some extent, the extent of enhancement is not sufficiently high. Further, with the electrolyte manganese dioxide containing a sulfate group, problems of reduction of durability of a dry battery and unstable voltage thereof often occur.

Improved manganese dioxide having a controlled sodium content X and a controlled JIS-pH value Y, which satisfy the following formula: Y>4.7X+2.4, and which manganese dioxide specifically has a JIS-pH value of 3.5 to 5.0, was proposed in Japanese Unexamined Patent Publication No. 2001-026425. Although the high-rate characteristics of the manganese dioxide proposed in this patent publication is enhanced to some extent, the extent of enhancement is still not sufficiently high, Further, a problem of corrosion often occurs in the process for making the battery.

SUMMARY OF THE INVENTION

A primary object of the present invention is to provide electrolyte manganese dioxide for use as an active material for a cathode for a manganese dry battery, especially for an alkaline manganese dry battery, which battery exhibits improved high-rate discharge characteristics, and causes no problem of metal corrosion at the step of making a cathode from the manganese dioxide.

To achieve the above-mentioned object, the present inventors made extensive research and found that electrolytic manganese dioxide having a surface sulfate ($SO_4$) content of smaller than 0.10% by weight and a JIS-pH value, as measured according to JIS K1467, of at least 1.5 but smaller than 3.5, preferably at least 2.1 but smaller than 3.2, gives a dry battery exhibiting improved high-rate discharge characteristics.

Further, it was found that, in the case when 3% to 25% in number of the fine particles of the above-mentioned electrolytic manganese dioxide have a particle diameter of not larger than 1 μm, more enhanced improved high-rate discharge characteristics can be obtained.

Further, it was found that, when the content of sodium X (ppm) in the electrolytic manganese dioxide and the median diameter Y (μm) of the fine particles have a specific relationship, the electrolytic manganese dioxide gives a dry battery exhibiting improved high-rate discharge characteristics and causing no problem of metal corrosion at the step of making a cathode from the electrolytic manganese dioxide.

Based on the above-mentioned findings, the present invention has been completed.

In accordance with the present invention, there is provided electrolytic manganese dioxide which is in the form of fine particles characterized by having a surface sulfate ($SO_4$) content of smaller than 0.10% by weight, and a JIS-pH value, as measured according to JIS K1467, of at least 1.5 but smaller than 3.5, preferably at least 2.1 but smaller than 3.2.

DESCRIPTION OF THE PREFERRED EMBODIMENT

Figure 1:
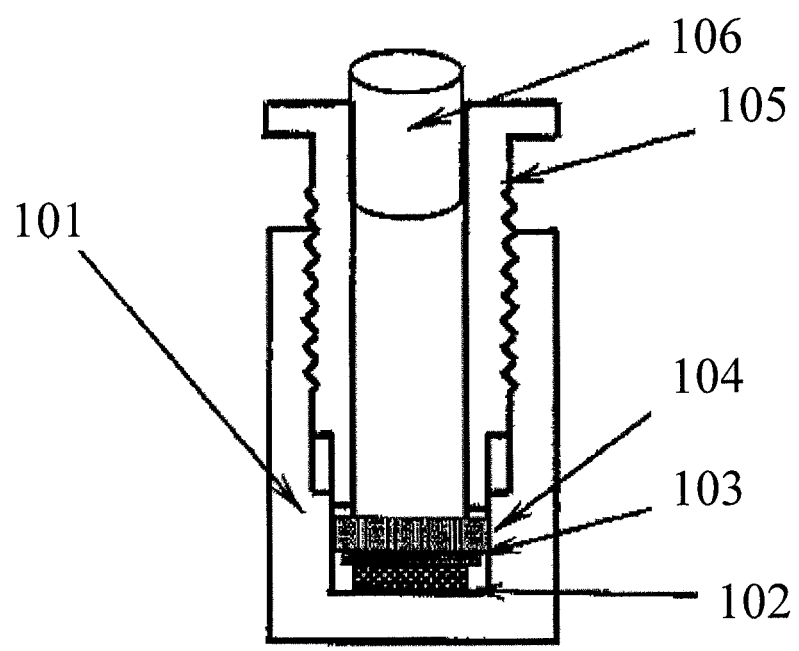
FIG. 1 is a schematic sectional view illustrating an apparatus used for metal corrosion test of electrolytic manganese dioxide.

The amount of sulfate ($SO_4$) contained in electrolytic manganese dioxide is classified into (1) a surface sulfate content, i.e., an amount of sulfate present on the surface of electrolytic manganese dioxide particles, and (2) an inside sulfate content, i.e., an amount of sulfate present inside the electrolytic manganese dioxide particles. When electrolytic manganese dioxide is produced, for example, by electrolytic deposition of an electrolytic liquid containing manganese sulfate and sulfuric acid, a part of the sulfuric acid used is entrapped inside the deposited electrolytic manganese dioxide. The form of sulfuric acid present inside the electrolytic manganese dioxide is not clear, but, even when the electrolytic manganese dioxide is thoroughly washed with water or neutralized, a part of the electrolytic manganese dioxide remains without removal from the electrolytic manganese dioxide. This part of the electrolytic manganese dioxide constitutes the inside sulfate content.

By the term "surface sulfate content" as used herein, we mean the content of sulfate as calculated by taking an inside sulfate content from the total sulfate content. The inside sulfate content is determined by a method wherein as-deposited manganese dioxide is washed thoroughly with water until the JIS-pH value becomes unchanged or is neutralized to a JIS-pH value of 4.5, and then the amount of sulfate remaining in the washed or neutralized manganese dioxide is measured. The total sulfate content is the amount of sulfate contained in the deposited manganese dioxide as measured before the water-washing or neutralization. The determination of the inside sulfate content and the total sulfate content is conducted by atomic absorption spectroscopy or ICP (atomic emission spectrochemical analysis).

The inside sulfate content varies depending upon the particular method for making the electrolyte manganese dioxide, but is usually in the range of about 0.90% to about 1.25% by weight.

The electrolytic manganese dioxide according to the present invention is characterized by having a surface sulfate ($SO_4$) content of smaller than 0.10% by weight, and a JIS-pH value, as measured according to JIS K1467, of at least 1.5 but smaller than 3.5, preferably at least 2.1 but smaller than 3.2.

If the electrolytic manganese dioxide has a JIS-pH value of at least 3.5, the high-rate discharge characteristics are not enhanced as compared with the conventional electrolyte manganese dioxide. In contrast, if the electrolytic manganese dioxide has a JIS-pH value of smaller than 1.5, the high-rate discharge characteristics are often good, but, due to too high acidity, a resulting battery tends to be poor in durability, and a problem of corrosion of an apparatus for fabricating a cathode material and of a battery can.

The JIS-pH value as used herein is determined by the conventional method for measuring the degree of neutralization, that is, by an ammonium chloride method according to JIS K-1467 wherein a predetermined amount (10.0 g) of manganese dioxide is incorporated in a predetermined amount of ammonium chloride buffer solution (50 ml of 20 g $NH_4Cl/100$ ml $H_2O$), and the pH value of the supernatant liquid is measured at 25±2° C.

The surface sulfate content can be lowered below 0.10% by weight by washing as-produced electrolyte manganese dioxide with a large amount of water, or by neutralizing to a JIS-pH value of 3.5 or higher, by the conventional manner, but the thus-obtained electrolyte manganese dioxide is different from that of the present invention. The electrolyte manganese dioxide according to the present invention must have a JIS-pH value lowered below 3.5 as well as a surface sulfate content lowered below 0.10% by weight.

The electrolyte manganese dioxide according to the present invention is usually in the form of fine particles. The particle diameter of the fine particles is not particularly limited, but preferably, 3% to 25% in number of the fine electrolytic manganese dioxide particles have a particle diameter of not larger than 1 μm, for more enhancing the high-rate discharge characteristics.

If the fine electrolytic manganese dioxide particles contain fine particles having a particle diameter of not larger than 1 μm, in an amount of smaller than 3% in number, a powder molding made by press-molding the fine electrolytic manganese dioxide particles is too fragile and easily broken. In contrast, if the fine electrolytic manganese dioxide particles contain fine particles having a particle diameter of not larger than 1 μm, in an amount of larger than 25% in number, when carbon is incorporated for imparting electrical conductivity, the contact of electrolytic manganese dioxide with carbon is reduced and the utilization of electrolytic manganese dioxide in a cell tends to be lowered.

The maximum diameter of the fine electrolytic manganese dioxide particles is not particularly limited, but is preferably not larger than 100 μm. If a portion of the fine electrolytic manganese dioxide particles has a particle diameter of larger than 100 μm, the inner surface of a vessel for dry battery is marred, thus a plated metal on the inner surface of vessel is marred and the exposed iron tends to react and generate gases. Further a separator for electrical insulation between an anode made of, e.g., zinc, and a cathode made of a powder molding of electrolyte manganese dioxide is chemically damaged with the result that the powdery electrolytic manganese dioxide as cathode active material is brought into direct contact with the zinc anode. Consequently self-discharge undesirably occurs during storage of battery, leading to the reduction of capacity.

The fine electrolytic manganese dioxide particles preferably have a median particle diameter within the range of 15 μm and 70 μm. If the median particle diameter is larger than 70 μm, the total surface area of the fine electrolyte manganese dioxide particles is undesirably reduced with the result of lowering of cell reaction. In contrast, if the median particle diameter is smaller than 15 μm, the amount of fine particles filled within a vessel of battery is reduced to a great extent.

The amount in number of the fine particles having a particle diameter of not larger than 1 μm, the maximum particle diameter of the fine particles and the median diameter of the fine particles are determined by a light scattering particle counter method as follows.

A liquid having dispersed therein fine electrolytic manganese dioxide particles is irradiated with a laser beam and scattered light is measured by a light scattering particle counter apparatus "Micro-trac particle diameter distribution measuring apparatus" available from Nikkiso Co., Ltd. to determine the particle diameter and the number of particles.

Sodium contained in the fine electrolytic manganese dioxide particles according to the present invention includes both of a sodium ion and a sodium compound such as sodium hydroxide.

Sodium contained in the tine electrolytic manganese dioxide particles is derived from a sodium hydroxide neutralizing agent used for adjustment of pH value of the fine particles. The predominant part of sodium is adsorbed on the surface of particles. As an electrical discharge cell reaction, a reaction for diffusing protons inside the particles from the particle surface. If the amount of sodium present on the surface of particles is too large, the proton-diffusing reaction is inhibited, leading to reduction of high-rate discharge characteristics. In contrast, if the amount of sodium present on the surface of particles is too small, relatively good discharge characteristics can be generally obtained, but corrosion of other metal material is caused with a decrease of the sodium content when a dry battery is made from the electrolytic manganese dioxide.

The content of sodium X (ppm) in the electrolytic manganese dioxide and the median diameter Y (μm) of the fine particles preferably have a relationship satisfying the following formula (1):

$$-0.016X+56.8 \leq Y \leq -0.04X+134 \qquad (1)$$

When the electrolytic manganese dioxide satisfies the above-mentioned formula (1), a resulting battery exhibits improved high-rate discharge characteristics, and causes no problem of metal corrosion at the step of making a cathode from the electrolytic manganese dioxide.

Further, the content of sodium X (ppm) in the electrolytic manganese dioxide and the median diameter Y (μm) of the fine particles preferably have a relationship satisfying the following formula (2):

$$-0.016X+56.8 \leq Y \leq -0.016X+71.2 \qquad (2)$$

When the electrolytic manganese dioxide satisfies the above-mentioned formula (2), a resulting battery exhibits more improved high-rate discharge characteristics, and causes no problem of metal corrosion at the step of making a cathode from the electrolytic manganese dioxide. A resulting battery exhibits at least 425 discharge times when an AA size battery provided with a cathode made from the active material is subjected to a 1 A pulse discharge test at a discharge time of 10 seconds, a quiescent time of 50 seconds and a cut-off voltage of 0.9 V.

The reason for which improved high-rate discharge characteristics and good metal corrosion resistance can be obtained with the electrolytic manganese dioxide satisfying the above-mentioned formulae (1) and/or (2) is not clear. But, it is presumed that the content of sodium adsorbed on the surface of electrolytic manganese dioxide particles, and the size of voids among the particles which vary depending upon the particular median particle diameter, influence the surface hydrophilic property of particles and the liquid retention characteristics thereof. Consequently a solid-liquid-solid interface is not formed among the electrolytic manganese dioxide, a liquid electrolyte and a metal material, and therefore, the corrosion of metal is prevented or minimized.

The content of sodium in the fine electrolytic manganese dioxide particles is determined by a method wherein the fine electrolytic manganese dioxide particles are dissolved in an aqueous solution of hydrochloric acid and hydrogen peroxide, and the sodium content is measured by atomic-absorption spectroscopy.

When the content of sodium in the electrolytic manganese dioxide and the median diameter of the fine particles satisfy the above-mentioned formulae (1) and/or (2), improved high-rate discharge characteristics and good metal corrosion resistance can be obtained, but, the content of sodium is especially preferably not larger than 2,000 ppm.

The active material for use in a cathode for battery according to the present invention comprises the above-mentioned electrolytic manganese dioxide.

The cathode active material can comprise additional ingredients, which are not particularly limited. The additional ingredients include, for example, an electrically conductive material such as graphite, and an aqueous potassium hydroxide solution.

The cathode active material according to the present invention gives a battery having improved high-rate discharge characteristics and good metal corrosion resistance. In the case when the cathode active material is used for making an AA size battery, the resulting battery exhibits at least 400 discharge times, preferably at least 425 times, when the battery is subjected to a 1 A pulse discharge test at a discharge time of 10 seconds, a quiescent time of 50 seconds and a cut-off voltage of 0.9 V.

The invention will now be described in detail by the following examples and comparative examples that by no means limit the scope of the invention.

In these working examples, high-rate characteristics of an AA size battery provided with a cathode made from manganese dioxide active material, storage stability of manganese dioxide, and metal corrosion of electrolytic manganese dioxide were evaluated by the following methods.

High-Rate Characteristics of Battery 5 g of a powdery mixture comprising 85.8 wt. % of powdery manganese dioxide, 7.3 wt. % of graphite and 6.9 wt. % of an aqueous 40% potassium hydroxide electrolyte was molded at a molding pressure of 2 ton into a ring-form molding. Two of the molding as a cathode material, and zinc as an anode material were assembled into an AA size dry battery. After the battery was left to stand at room temperature for 24 hours, a discharge test was carried out under the following discharge conditions. A cycle comprising, as one pulse, a discharge at 1,000 mA for 10 seconds and a quiescent time of 50 seconds was repeated until the final voltage reached 0.9 V. The discharge characteristics were evaluated by the number of pulses.

Storage Stability of Manganese Dioxide

The above-mentioned AA size dry battery was allowed to stand in an atmosphere maintained at 60° C. for 20 days, and then the high-rate characteristics were tested by the above-mentioned method.

Metal Corrosion of Electrolytic Manganese Dioxide

A powdery mixture comprising 10 g of powdery electrolytic manganese dioxide, 0.7 g of graphite and 0.3 g of an aqueous 40 wt. % potassium hydroxide electrolyte was molded at a molding pressure of 2.5 ton into a pellet-form molding (20 mm in diameter). As illustrated in FIG. 1, the molding 102 was placed on the bottom of a testing vessel 101 made wholly of polyvinyl chloride. SKD-11 plate 103, which is conventionally used for molding a cathode for battery, was polished and then placed on the pellet-form molding 102. Further a perforated plate 104 made of polyvinyl chloride was placed on the SKD-11 plate 103. An assembly of the molding 102, the SKD-11 plate 103 and the perforated plate 104 was pressed using a torque wrench of 5 Nm by a screw type sleeve 105 with a silicone rubber plug 106 at the top of the sleeve 105.

The testing vessel 101 comprising the pressed assembly was left to stand for 3 days in a thermostat maintained at a temperature of 50° C. and a relative humidity of 95%. Thereafter the SKD-11 plate 103 was taken out, and then, the SKD-11 plate 103 was treated with an aqueous sodium bicarbonate solution to thoroughly remove the pellet-form molding. Then the SKD-11 plate 103 was washed with water and then with acetone, and then dried for 1 hour. The rate of corrosion was evaluated by the difference between the weight of SKD-11 plate 103 as measured before the corrosion test and the weight thereof as measured after the corrosion test. The corrosion rate was expressed by the rate of reduction of thickness per year (mm/y).

Example 1

Electrolytic manganese dioxide was produced using an electrolytic vessel having an inner volume of 20 liters equipped with a heating apparatus wherein a titanium plate as a cathode and a graphite plate as an anode were suspended so as to confront to each other. An aqueous manganese sulfate solution was used as an electrolyte liquid. The composition of the electrolyte liquid was adjusted so that the concentration of divalent manganese was 40 g/l and the concentration of sulfuric acid was 50 g/l. The temperature of electrolyte liquid was maintained at 95° C., and the current density was 60 A/m$^2$.

After the completion of electrolysis, the thus-deposited electrolytic manganese dioxide was washed with pure water, and was separated by impact. The mass of electrolytic manganese dioxide was pulverized into a powder. The powder was neutralized until the JIS-pH value reached 3.14, and the neutralized powder was washed with water and then dried to give a powdery electrolytic manganese dioxide.

The JIS-pH value was determined by the conventional method for measuring the degree of neutralization, that is, by an ammonium chloride method according to JIS K-1467 wherein a predetermined amount (10.0 g) of manganese dioxide was incorporated in a predetermined amount of ammonium chloride buffer solution (50 ml of $NH_4Cl$ 20 g/100 g $H_2O$), and the pH value of the supernatant liquid was measured at 25° C.

The powdery electrolytic manganese dioxide was dissolved in an aqueous solution of hydrochloric acid and aqueous hydrogen peroxide, and the content of sulfate group was measured by the atomic-absorption spectroscopy. The content of sulfate in the electrolytic manganese dioxide as measured after the JIS-pH value reached 3.14 was 1.18 wt. %. The content of sulfate in the electrolytic manganese dioxide as measured after the JIS-pH value reached 4.5 was 1.17 wt. %. Thus, the content of surface sulfate was 0.01 wt. %.

5 g of a powdery mixture comprising 85.8 wt. % of powdery manganese dioxide, 7.3 wt % of graphite and 6.9 wt. % of an aqueous 40 wt. % potassium hydroxide electrolyte was molded at a molding pressure of 2 ton into a ring-form molding. Two of the molding as a cathode material, and zinc as an anode material were assembled into an AA size dry battery. The discharge test of the battery was carried out by the above-mentioned method. The number of discharge times was 474.

The results of evaluation of the properties of manganese dioxide and the properties of battery are shown in Table 1. The deterioration of the AA size dry battery as measured after standing at 60° C. for 20 hours was not found.

Examples 2 to 6

Powdery electrolytic manganese dioxide was produced by the same procedures as mentioned in Example 1 wherein as-produced powdery electrolytic manganese dioxide was neutralized until the JIS-pH reached a value in the range of 1.56 to 3.44 instead of 3.14. All other conditions remained the same. The evaluation results are shown in Table 1.

Comparative Example 1

Powdery electrolytic manganese dioxide was produced by the same procedures as mentioned in Example 1 wherein as-produced powdery electrolytic manganese dioxide was neutralized until the JIS-pH value reached 1.44 instead of 3.14 with all other conditions remaining the same. The content of sulfate in the electrolytic manganese dioxide was 1.28 wt. %. The content of sulfate in the electrolytic manganese dioxide as measured after the JIS-pH value reached 4.5 was 1.16 wt. %, Thus, the content of surface sulfate was 0.12 wt. %. The evaluation results are shown in Table 1.

Comparative Example 2

Powdery electrolytic manganese dioxide was produced by the same procedures as mentioned in Example 1 wherein the neutralization was carried out until the JIS-pH value reached 3.78 instead of 3.14 with all other conditions remaining the same. The content of surface sulfate was 0.00 wt. %. The evaluation results are shown in Table 1.

TABLE 1

| | Content of surface sulfate (wt. %) | JIS-pH (—) | Discharge test*1 (no. of times) |
|---|---|---|---|
| Example 1 | 0.01 | 3.14 | 474 |
| Example 2 | 0.09 | 2.10 | 462 |
| Example 3 | 0.07 | 1.56 | 463 |
| Example 4 | 0.08 | 1.76 | 427 |
| Example 5 | 0.05 | 2.26 | 445 |
| Example 6 | 0.02 | 3.44 | 428 |
| Com. Ex. 1 | 0.12 | 1.44 | 395 |
| Com. Ex. 2 | 0.00 | 3.78 | 360 |

*1 Cycle number at 1 A pulse discharge in AA size dry battery

Example 7

Powdery electrolytic manganese dioxide was produced by the same procedures as mentioned in Example 1 wherein the deposited electrolytic manganese dioxide was washed with pure water, and separated by impact. Then the mass of electrolytic manganese dioxide was pulverized into a powder while the particle diameter was examined by the above-mentioned light scattering particle counter apparatus "Micro-trac particle diameter distribution measuring apparatus". The thus-obtained powder was washed and neutralized until the JIS-pH value reached 2.98, and the neutralized powder was washed with water and the dried to give a powdery electrolytic manganese dioxide.

The powdery electrolytic manganese dioxide contained 13.8% in number of the fine powders having a particle diameter of smaller than 1 μm. The median diameter was 45 μm.

The powdery electrolytic manganese dioxide was dissolved in an aqueous solution of hydrochloric acid and aqueous hydrogen peroxide, and the content of sulfate group was measured by the atomic-absorption spectroscopy. The content of sulfate in the electrolytic manganese dioxide as measured after the JIS-pH value reached 2.98 was 1.13 wt. %. The content of sulfate in the electrolytic manganese dioxide as measured after the JIS-pHvalue reached 4.5 was 1.11 wt. %. Thus, the content of surface sulfate was 0.02 wt. %, The content of sodium as measured by the same method as mentioned in Example 1 was 1,250 ppm.

A powdery mixture comprising 10 g of the powdery electrolytic manganese dioxide, 0.7 g of graphite and 0.3 g of an aqueous 40 wt. % potassium hydroxide electrolyte was molded at a molding pressure of 2.5 ton into a pellet-form molding (20 mm in diameter). A corrosion test was carried out by the same method as mentioned in Example 1. The corrosion rate was smaller than 0.01 mm/y.

5 g of a powdery mixture comprising 65.8 wt. % of the powdery manganese dioxide, 7.3 wt. % of graphite and 6.9 wt. % of an aqueous 40 wt. % potassium hydroxide electrolyte was molded at a molding pressure of 2 ton into a ring-form molding. Using two of the molding as a cathode material, an AA size dry battery was made, and the discharge test of the battery was carried out by the same method as mentioned in Example 1. The number of discharge times was 472.

The results of evaluation of the properties of manganese dioxide and the properties of battery are shown in Table 2. The deterioration of the AA size dry battery as measured after standing at 60° C. for 20 hours was not found.

Examples 8 to 11

Powdery electrolytic manganese dioxide was produced by the same procedures as mentioned in Example 7 wherein as-produced powdery electrolytic manganese dioxide was neutralized until the JIS-pH reached a value in the range of 1.69 to 2.76 instead of 2.98. All other conditions remained the same. The evaluation results are shown in Table 2.

Example 12

Powdery electrolytic manganese dioxide was produced by the same procedures as mentioned in Example 7 wherein as-produced powdery electrolytic manganese dioxide was neutralized until the JIS-pH value reached 2.19 instead of 2.98 with all other conditions remaining the same. The content of surface sulfate was 0.04 wt. %. The content of sodium was 1,500 ppm. The powdery electrolytic manganese dioxide contained 2.8% in number of the fine powders having a particle diameter of smaller than 1 μm. The median diameter was 70 μm.

A powdery mixture comprising 10 g of the powdery electrolytic manganese dioxide, 0.7 g of graphite and 0.3 g of an aqueous 40 wt. % potassium hydroxide electrolyte was molded at a molding pressure of 2.5 ton into a pellet-form molding (20 mm in diameter). A corrosion test was carried out by the same method as mentioned in Example 7. The corrosion rate was smaller than 0.01 mm/y.

5 g of a powdery mixture comprising 85.8 wt. % of the powdery manganese dioxide, 7.3 wt. % of graphite and 6.9 wt. % of an aqueous 40 wt. % potassium hydroxide electrolyte was molded at a molding pressure of 2 ton into a ring-form molding. Using two of the molding as a cathode material, an AA size dry battery was made, and the discharge test of the battery was carried out by the same method as mentioned in Example 7. The number of discharge times was 418. The evaluation results are shown in Table 2.

Examples 13 to 16

Powdery electrolytic manganese dioxide was produced by the same procedures as mentioned in Example 12 wherein as-produced powdery electrolytic manganese dioxide was neutralized until the JIS-pH reached a value in the range of 1.99 to 3.28 instead of 2.19. All other conditions remained the same. The evaluation results are shown in Table 2.

Comparative Example 3

Powdery electrolytic manganese dioxide was produced by the same procedures as mentioned in Example 12 wherein as-produced powdery electrolytic manganese dioxide was neutralized until the JIS-pH value reached 3.55 instead of 2.19 with all other conditions remaining the same. The content of surface sulfate was 0.02 wt. %. The content of sodium was 2,000 ppm. The powdery electrolytic manganese dioxide contained 20.5% in number of the fine powders having a particle diameter of smaller than 1 μm. The median diameter was 60 μm.

A powdery mixture comprising 10 g of the powdery electrolytic manganese dioxide, 0.7 g of graphite and 0.3 g of an aqueous 40 wt. % potassium hydroxide electrolyte was molded at a molding pressure of 2.5 ton into a pellet-form molding (20 mm in diameter). A corrosion test was carried out by the same method as mentioned in Example 12. The corrosion rate was smaller than 0.01 mm/y.

5 g of a powdery mixture comprising 85.8 wt. of the powdery manganese dioxide, 7.3 wt. % of graphite and 6.9 wt. % of an aqueous 40 wt. % potassium hydroxide electrolyte was molded at a molding pressure of 2 ton into a ring-form molding. Using two of the molding as a cathode material, an AA size dry battery was made, and the discharge test of the battery was carried out by the same method as mentioned in Example 12. The number of discharge times was 392. The evaluation results are shown in Table 2.

Comparative Example 4

Powdery electrolytic manganese dioxide was produced by the same procedures as mentioned in Example 12 wherein as-produced powdery electrolytic manganese dioxide was neutralized until the JIS-pH value reached 3.52 instead of 2.19 with all other conditions remaining the same. The evaluation results are shown in Table 2.

Comparative Example 5

Powdery electrolytic manganese dioxide was produced by the same procedures as mentioned in Example 12 wherein as-produced powdery electrolytic manganese dioxide was neutralized until the JIS-pH value reached 1.44 instead of 2.19 with all other conditions remaining the same. The content of surface sulfate was 0.10 wt. %. The content of sodium was 360 ppm. The powdery electrolytic manganese dioxide contained 18.8% in number of the fine powders having a particle diameter of smaller than 1 μm. The median diameter was 45 μm.

A powdery mixture comprising 10 g of the powdery electrolytic manganese dioxide, 0.7 g of graphite and 0.3 g of an aqueous 40 wt. % potassium hydroxide electrolyte was molded at a molding pressure of 2.5 ton into a pellet-form molding (20 mm in diameter). A corrosion test was carried out by the same method as mentioned in Example 12. The corrosion rate was larger than 0.1 mm/y.

5 g of a powdery mixture comprising 85.8 wt. % of the powdery manganese dioxide, 7.3 wt. % of graphite and 6.9 wt. % of an aqueous 40 wt. % potassium hydroxide electrolyte was molded at a molding pressure of 2 ton into a ring-form molding. Using two of the molding as a cathode material, an AA size dry battery was made, and the discharge test of the battery was carried out by the same method as mentioned in Example 12. The number of discharge times was 436. The evaluation results are shown in Table 2.

Comparative Examples 6 and 7

Powdery electrolytic manganese dioxide was produced by the same procedures as mentioned in Example 12 wherein as-produced powdery electrolytic manganese dioxide was neutralized until the JIS-pH reached a value in the range of 1.35 to 1.39 instead of 2.19 with all other conditions remaining the same. The evaluation results are shown in Table 2.

Figure 2:
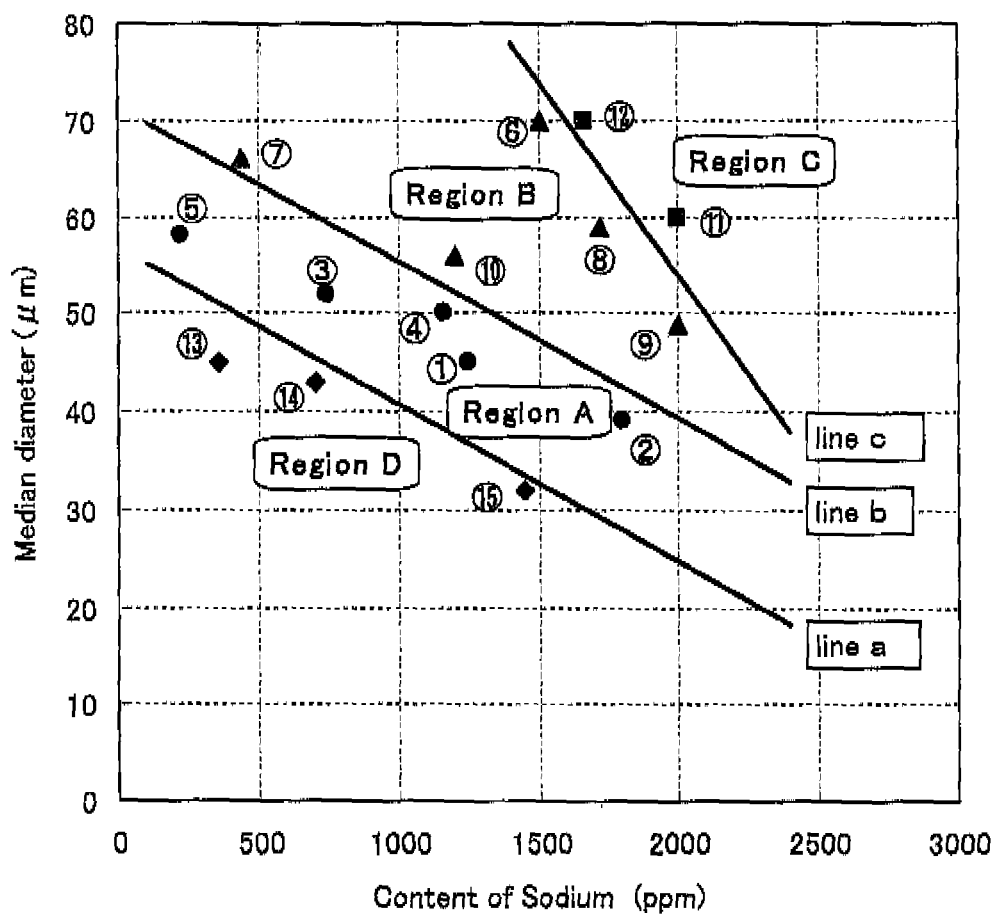
FIG. 2 illustrate graphs showing a relationship of median diameter (μm) of fine particles with content (ppm) of sodium in electrolytic manganese dioxide.

The relationship of median diameter (μm) of powdery electrolytic manganese dioxide with sodium content (ppm), obtained in each of Examples 7-16 and Comparative Examples 3-7, was shown in FIG. 2. In FIG. 2, ① through ⑮ (indicate the data obtained in the following working examples.

| | |
|---|---|
| ① | Example 7 |
| ② | Example 8 |
| ③ | Example 9 |
| ④ | Example 10 |
| ⑤ | Example 11 |
| ⑥ | Example 12 |
| ⑦ | Example 13 |
| ⑧ | Example 14 |
| ⑨ | Example 15 |
| ⑩ | Example 16 |
| ⑪ | Comparative Example 3 |
| ⑫ | Comparative Example 4 |
| ⑬ | Comparative Example 5 |
| ⑭ | Comparative Example 6 |
| ⑮ | Comparative Example 7 |

In FIG. 2, region A sandwiched between line a and line b includes data obtained in Examples 7 to 11, wherein excellent high-rate characteristics of cycle number of at least 425 at a 1 A pulse discharge test were manifested, and corrosion was not found. Region B sandwiched between line b and line c includes data obtained in Examples 12 to 16, wherein good high-rate characteristics of cycle number of at least 400 at a 1 A pulse discharge test were manifested, and corrosion was not found. Region C above line c includes data obtained in Comparative Examples 3 and 4, wherein corrosion was not found, but high-rate characteristics of cycle number of below 400 at a 1 A pulse discharge test were manifested. Region D under line a includes data obtained in Comparative Examples 5-7, wherein excellent high-rate characteristics of cycle number of at least 425 at a 1 A pulse discharge test were manifested, but corrosion occurred at a rate of >0.1 mm/y.

TABLE 2

|  | Content of sodium (ppm) | Content of surface sulfate (wt. %) | JIS-pH (—) | Amount of fine particles *1 (%) | Median diameter (μm) | Discharge test *2 (no. of pulse) | Rate of corrosion (mm/y) |
|---|---|---|---|---|---|---|---|
| Example 7 | 1250 | 0.02 | 2.98 | 13.8 | 45 | 472 | <0.01 |
| Example 8 | 1800 | 0.05 | 2.68 | 17.6 | 39 | 470 | <0.01 |
| Example 9 | 740 | 0.08 | 2.11 | 10.8 | 52 | 450 | <0.01 |
| Example 10 | 1160 | 0.04 | 2.76 | 9.8 | 50 | 468 | <0.01 |
| Example 11 | 220 | 0.09 | 1.69 | 6.6 | 58 | 438 | <0.01 |
| Example 12 | 1500 | 0.04 | 2.19 | 2.8 | 70 | 418 | <0.01 |
| Example 13 | 440 | 0.08 | 1.99 | 2.3 | 66 | 405 | <0.01 |
| Example 14 | 1720 | 0.04 | 3.18 | 2.9 | 59 | 419 | <0.01 |
| Example 15 | 2000 | 0.01 | 3.28 | 25.4 | 49 | 412 | <0.01 |
| Example 16 | 1200 | 0.03 | 2.88 | 25.8 | 56 | 422 | <0.01 |
| Com. Ex. 3 | 2000 | 0.02 | 3.55 | 20.5 | 60 | 392 | <0.01 |
| Com. Ex. 4 | 1660 | 0.05 | 3.52 | 25.3 | 70 | 345 | <0.01 |
| Com. Ex. 5 | 360 | 0.10 | 1.44 | 18.8 | 45 | 436 | >0.1 |
| Com. Ex. 6 | 700 | 0.14 | 1.35 | 19.9 | 43 | 438 | >0.1 |
| Com. Ex. 7 | 1450 | 0.09 | 1.39 | 23.8 | 32 | 442 | >0.1 |

*1 Amount in number of fine particle having particle diameter smaller than 1 μm
*2 Cycle number at 1 A pulse discharge in AA size dry battery

The invention claimed is:

1. An alkaline manganese dry battery comprising a cathode, an anode and an electrolyte wherein the cathode comprises an active material, which comprises electrolytic manganese dioxide in a form of fine particles characterized by having a surface sulfate ($SO_4$) content of smaller than 0.10% by weight and a JIS-pH value, as measured according to JIS K1467, of at least 1.5 but smaller than 3.5, wherein 3% to 25% of the total number of the fine electrolytic manganese dioxide particles have a particle diameter of not larger than 1 μm and a content of sodium X (ppm) in the electrolytic manganese dioxide and the median diameter Y (μm) of the fine electrolytic manganese dioxide particles have a relationship satisfying the following formula (2):

$$-0.016X+56.8 \leq Y \leq -0.016X+71.2 \qquad (2).$$

* * * * *